J. S. GREEN.
VEHICLE TIRE.
APPLICATION FILED JUNE 28, 1916.

1,218,548.

Patented Mar. 6, 1917.

WITNESSES
John Osborn Jr.
William M. Fisher

INVENTOR
Jesse S. Green.
By Victor J. Evans
Atty.

UNITED STATES PATENT OFFICE.

JESSE S. GREEN, OF FRANKLIN, PENNSYLVANIA.

VEHICLE-TIRE.

1,218,548.   Specification of Letters Patent.   Patented Mar. 6, 1917.

Application filed June 28, 1916. Serial No. 106,479.

*To all whom it may concern:*

Be it known that I, JESSE S. GREEN, a citizen of the United States, residing at Franklin, in the county of Venango and State of Pennsylvania, have invented new and useful Improvements in Vehicle-Tires, of which the following is a specification.

This invention relates to vehicle tires and particularly to that class of tires, the purpose of which is to afford the resiliency of a pneumatic tire without the disadvantages thereof.

In carrying out my invention I utilize certain spring arrangements which will admirably serve the purpose for which the device is intended.

For the purpose of a clear understanding of my invention I have illustrated one form embodying the essential features of my invention, it being understood that changes in form, proportion and minor details of construction may be resorted to without departing from the spirit of the invention or sacrificing any of its advantages.

Figure 1:
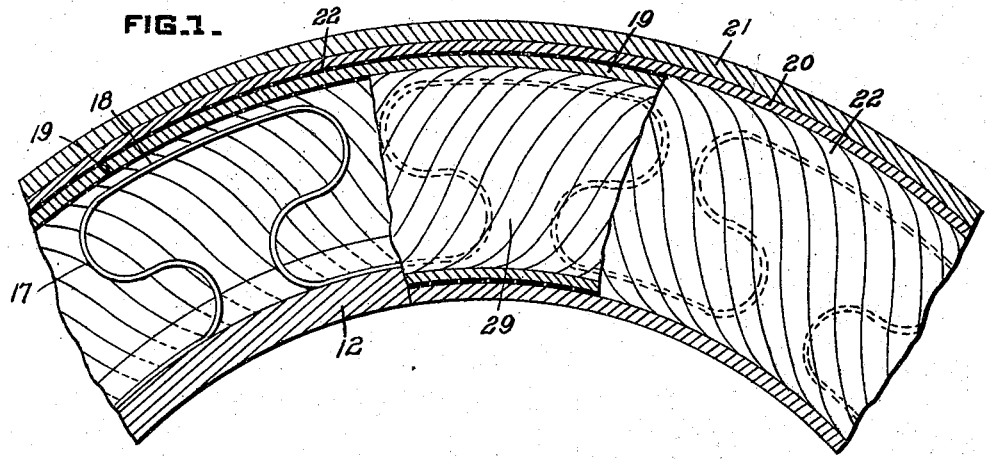
Figure 1 is a fragmentary sectional view through a tire constructed in accordance with my invention.
Figure 2:
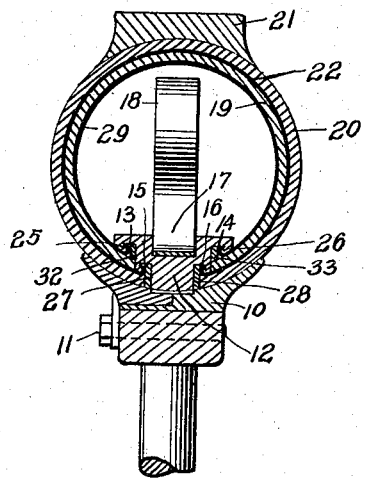
Fig. 2 is a cross-sectional view through the same.

Referring now to the drawings by numerals of reference;

10 designates a rim of a wheel which may be of any approved construction, but which is here shown as consisting of two pieces held together by the bolts 11. On the rim 10 is an anchoring strip 12 which for convenience may be made up of a plurality of sections end to end. The anchoring strip 12 is provided with stepped slotted portions, on both sides of its longitudinal center the slotted portions being designated by the reference numerals 13 and 14 and 15 and 16 respectively. Each slot has one wall throughout its length bulged inwardly of the slot as indicated at 25 for a purpose to be explained hereafter; but I wish to call attention to the fact that one wall of the slot may be undercut at an inclination. The anchoring strip also carries a spring ribbon or strip 17 which is shown as being curved back and forth to form relatively flat tread portions 18 in the form of loops; the tread portions 18 being preferably slightly spaced from the inner tube of the tire. The tire is provided with an inner tube 19 and an outer tube 20 both of which may be secured to the anchoring strip 12 or to the rim in the usual manner. The outer tube may be provided with a flat thickened tread portion 21, but this may not in all cases be desirable.

Figure 3:
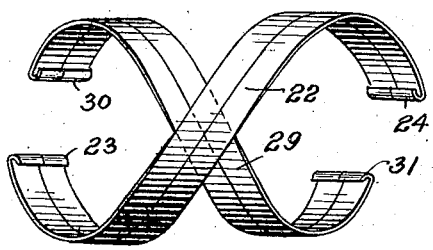
Fig. 3 is a detail view of a plurality of overlapping spring members, said spring members being detached from their anchoring strip.
Figure 4:
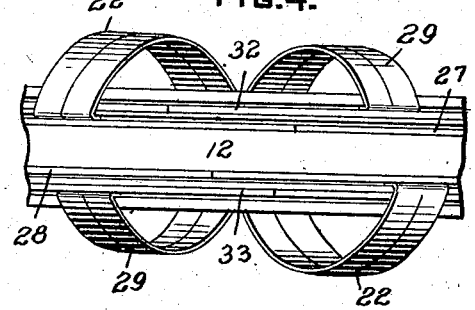
Fig. 4 is a similar view showing the spring strips attached to the anchoring strip.

Between the inner and outer tubes is a steel tube consisting of reversedly curved or spiral like strips 22 which are arranged edge to edge as shown in Figs. 3 and 4. The ends of the strips are formed with hooks or inturned ends 23 and 24 adapted to engage the under cut or bulged wall 25 of the slots 15 and 16 into which they may be secured by the wedges 27 and 28 inserted therein in any suitable manner.

By having the strips 22 and 29 running in different diagonal directions the strips of one tube will practically overlap those of the other and in this manner the respective tubes will be reinforced.

Within the inner tube 19 is shown a second sectional steel tube consisting of a plurality of separate spiral strips 29, said strips 29 being curved in opposite directions to the strips 22, but all the strips designated by the numeral 29 are arranged edge to edge, as are also those designated by the numeral 22. I have shown the strips 29 as spaced from the strips 22 by the tube 19, so there are really two steel tubes formed; one within the other and separated by the inner tube 19. The ends of the strips 29 are bent back upon themselves to form hooks or inturned ends 30 and 31, said inturned ends engaging the bulged wall of the slots 13 and 14 and being held in place by the calking wedges 32 and 33 respectively, whereby the strips 29 will be securely fastened to the anchor strip.

Under normal operating conditions there may be times when the spring strip 17 may not be required to take any of the load, particularly if the load is light. Under such conditions the tire will have a considerable amount of resiliency, but in the event of a heavy load, the tread of the tire will be flattened sufficiently to bring the spring strip 17 into use to oppose the weight of the load.

A tire constructed in accordance with my invention will be light, durable and efficient for the purpose intended.

What I claim and desire to secure by Letters Patent is;

1. A tire comprising an anchoring strip provided with undercut slots, a plurality of strips running diagonally of the anchoring strip and having their free ends bent back upon themselves to form hooks engaging the undercut portions of the slots, wedges in said slots, and an outer cover for said strips.

2. A tire comprising an anchoring strip having undercut slots in stepped relation, a pair of tubes each consisting of separate strips arranged edge to edge, and having hooked ends engaging the undercut portions of the slots, wedges in said slots and an outer covering.

3. In a tire, an anchoring strip formed with a slot a resilient strip having its end bent and positioned in the slot, a packing element filling the remaining space of said slot and a rim shaped to prevent the movement of the extremity of the strip out of the slot.

4. In a tire, an anchoring strip having a slot, one wall of which being bulged, a resilient strip having one end formed into a hook and a wedge element placed in said slot for forcing the hooked extremity into engagement with said bulged wall.

5. In combination, a rim, an anchoring strip bearing upon said rim and having annular slots spaced from the rim and resilient strips having their extremities arranged between the anchoring strip and the rim and engaging the walls of the slots.

6. In combination, a rim, an anchoring strip bearing upon said rim and having annular slots spaced from the rim and resilient strips each having its extremities formed into hooks arranged in the slots and a covering having a portion arranged between the rim and the hooked extremities of the strips.

7. In combination a rim, an anchoring strip bearing upon said rim and having annular slots spaced from the rim and resilient strips each having its extremities formed into hooks arranged in the slots and a covering having a portion arranged between the rim and the hooked extremities of the strips and wedge elements completely filling vacant space in said slots.

In testimony whereof I affix my signature in presence of two witnesses.

JESSE S. GREEN.

Witnesses:
ELMER KECHLER,
WILLIAM M. FISHER.

Copies of this patent may be obtained for five cents each, by addressing the "Commissioner of Patents, Washington, D. C."